United States Patent [19]

Wilson

[11] Patent Number: 5,329,722
[45] Date of Patent: Jul. 19, 1994

[54] FISHING FLOAT

[76] Inventor: Shane V. Wilson, R.R. 1, Box 137, Alexandria, Ind. 46001

[21] Appl. No.: 166,282

[22] Filed: Dec. 13, 1993

Related U.S. Application Data

[63] Continuation of Ser. No. 995,357, Dec. 22, 1992, abandoned, which is a continuation of Ser. No. 786,284, Nov. 1, 1991, abandoned.

[51] Int. Cl.⁵ ............................................. A01K 93/00
[52] U.S. Cl. .................................. 43/44.94; 43/44.87
[58] Field of Search .................. 43/44.94, 44.95, 44.9, 43/44.91, 44.92, 44.87

[56] References Cited

U.S. PATENT DOCUMENTS

| | | | |
|---|---|---|---|
| 983,309 | 2/1911 | Pflueger | 43/44.94 |
| 1,870,520 | 8/1932 | Loehr | 43/43.1 |
| 1,950,933 | 3/1934 | Snell | 43/44.94 |
| 2,163,483 | 6/1939 | Carlisle | 43/44.95 |
| 2,569,822 | 10/1951 | Miller | 43/44.95 |
| 2,867,936 | 1/1959 | Lambach | 43/44.95 |
| 3,323,247 | 6/1967 | Murray | 43/44.95 |
| 3,800,459 | 4/1974 | Fleischaker | 43/44.9 |
| 3,866,346 | 2/1975 | Schneider | 43/44.94 |
| 3,918,193 | 11/1975 | Schneider | 43/44.94 |
| 4,986,023 | 1/1991 | Bucholz | 43/44.9 |

OTHER PUBLICATIONS

Fishing Float—Commercially available float having a stem with a slot, and a spring for urging a fishing line in a direction away from the buoyant member.

Primary Examiner—P. Austin Bradley
Assistant Examiner—Chuck Y. Mah
Attorney, Agent, or Firm—Frost & Jacobs

[57] ABSTRACT

A fishing float is disclosed having a stem and a buoyant member. The stem includes a slot oriented toward the buoyant member for receiving a fishing line. When a fishing line is attached to the fishing float, the configuration and orientation of the slot keeps the fishing line attached to the fishing float, even when the person fishing jerks on the fishing line. A spring is mounted around a portion of one end of the stem, and resists the movement of the fishing line out of the slot. The spring can be located in two positions, one creating a slip line condition such that the fishing line can slide through the slot, and the other creating a fixed line condition such that the fishing line cannot freely slide through the slot.

16 Claims, 4 Drawing Sheets

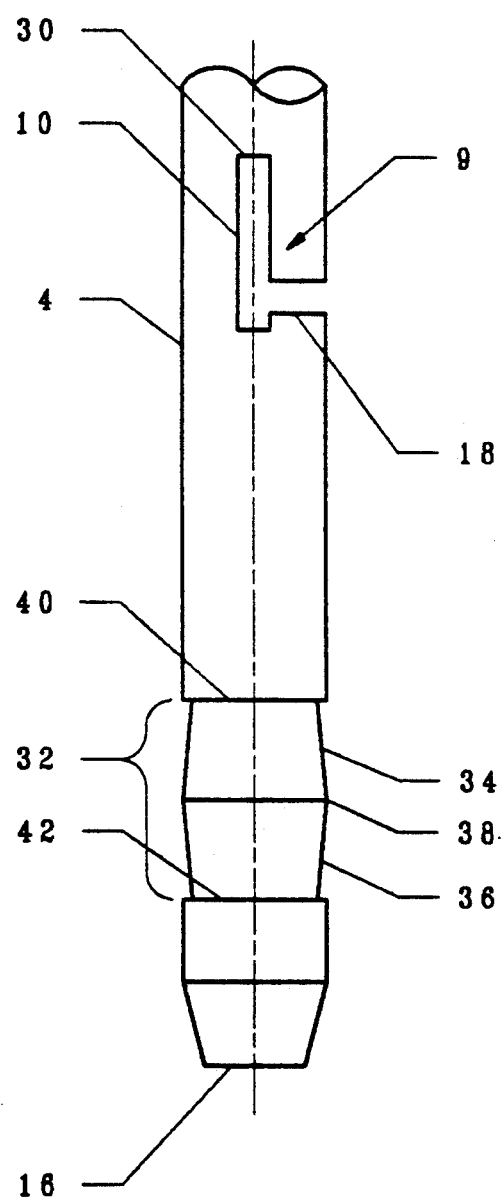
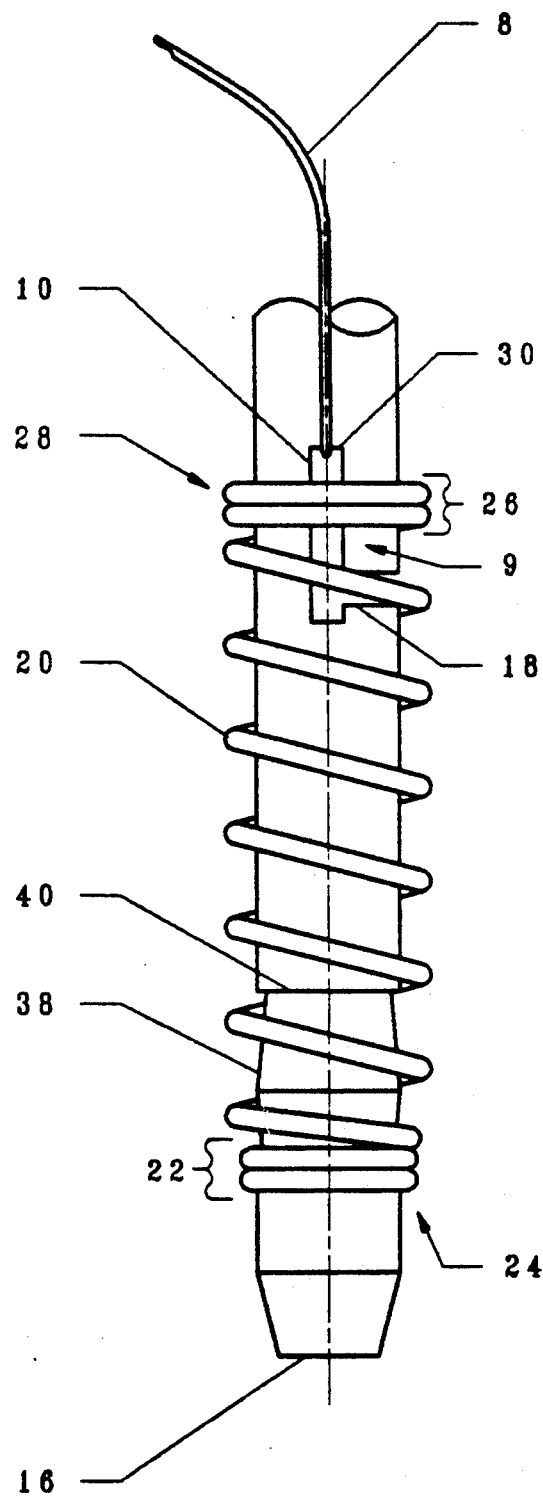
FIG. 2
FIG. 3

FISHING FLOAT

This is a continuation of application Ser. No. 07/995,357, filed Dec. 22, 1992, now abandoned which application is a continuation of Ser. No. 07/786,284 filed Nov. 1, 1991, now abandoned.

TECHNICAL FIELD

The present invention relates generally to fishing floats and is particularly directed to fishing floats which do not become detached from the fishing line as a result of the fisherman jerking the fishing line, such as to set the hook. The invention will be specifically disclosed in connection with a fishing float which has a uniquely oriented slot for receiving a fishing line.

BACKGROUND OF THE INVENTION

Many fishing floats that are manufactured today have a tendency to become detached from the fishing line at the time when the person fishing jerks the line in an upward movement, in an attempt to set the hook in the mouth of a fish. If the float becomes detached from the line, in many situations the float becomes lost. If a person is fishing from the bank or shore, retrieving the float may be impossible. Even when a person is fishing from a boat, retrieving the float can cause problems.

Typical of a fishing float in the prior art is the invention by V. J. Schneider, U.S. Pat. No. 3,866,346. Schneider discloses a fishing float which has a relatively long stem which, in normal operation, sits vertically in the water, being supported by a floatable bobber. A slot is located in the end of this stem, the end that would normally be below water. The longitudinal portion of the slot is oriented along the longitudinal axis of the stem, and the lateral portion connects to the longitudinal portion at a perpendicular angle. The lateral portion extends inwardly from the outer diameter of the stem through approximately one-half of the stem's diameter and communicates with the longitudinal portion at about the stem's center. The longitudinal portion extends from the lateral portion in a direction away from the floatable bobber toward the lower end of the stem.

To use the Schneider float, the fishing line is inserted into the slot at the point where the lateral portion reaches the outer diameter of the stem, pushed through the lateral portion and into the longitudinal portion, so that it fits near the bottom of the longitudinal portion. When the fishing line is jerked by the person fishing, it tends to ride up the longitudinal portion and, rather than riding up into the small upper portion of the slot which is aligned with the longitudinal portion, it frequently travels out through the lateral portion. When that occurs, the fishing float becomes detached from the fishing line, and the float is either lost, or must be retrieved.

The Schneider float is supposed to retain the fishing line in the slot. Unfortunately, practical experience gained by the actual use of fishing floats of the type disclosed by Schneider indicates that the fishing line often does slide out of the lateral portion, and does not continue upwardly into the small upper portion of the slot.

SUMMARY OF THE INVENTION

Accordingly, it is a primary object of the present invention to provide a fishing float which is capable of retaining the fishing line at the time the person fishing jerks on that fishing line to set the hook in the mouth of a fish.

A still further object of the invention is to provide a fishing float which is easy to use by an ordinary fisherman.

It is another object of the present invention to provide a fishing float which is capable of being operated in a slip line condition such that the fishing line can slide through the fishing float while the fishing float is being used in the water.

It is yet another object of the present invention to provide a fishing float which is capable of being used in a fixed line condition, meaning that the fishing line can be firmly attached to the fishing float while the float is being used in the water.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fishing float is provided for use with a fishing line which resists becoming detached from said fishing line when the fishing line is jerked by the person fishing. The fishing float includes a stem with a first end, a buoyant member carried by the stem, a slot formed in the stem between the buoyant member and the first stem end, and means for resisting the movement of a fishing line disposed in the slot in a direction away from the buoyant member and toward the first stem end.

In accordance with another aspect of the present invention, the slot is inclined inwardly in a direction away from the first stem end and toward the buoyant member.

In accordance with a further aspect of the present invention, the slot includes a lateral portion and a longitudinal portion, with the longitudinal portion extending from the lateral portion in a direction toward the buoyant member, the longitudinal portion having a first end located between the lateral portion and the buoyant member.

In another aspect of the present invention, the means comprises a spring having a first end and a second end, with the first spring end being disposed between the lateral portion and the first end of the longitudinal portion.

In a still further aspect of the present invention, the first spring end is moveable to a location between the lateral portion and the first stem end so as to create a line receiving condition.

In another aspect of the present invention, the first spring end is moveable between a first position located between the lateral portion and the first end of the longitudinal portion so as to create a slip line condition, and a second position located between the first end of the longitudinal portion and the buoyant member so as to create a fixed line condition.

In still a further aspect of the present invention, the first spring end is moveable to a third position located between the lateral portion and the first stem end so as to create a line receiving condition.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is an elevational view of one end of the stem of the fishing float without the spring.

FIG. 3 is an elevational view of one end of the stem illustrating the spring in the slip line condition.

Reference will now be made in detail to the present preferred embodiment of the invention, an example of which is illustrated in the accompanying drawings.

DETAILED DESCRIPTION OF THE PREFERRED EMBODIMENT

Figure 1:
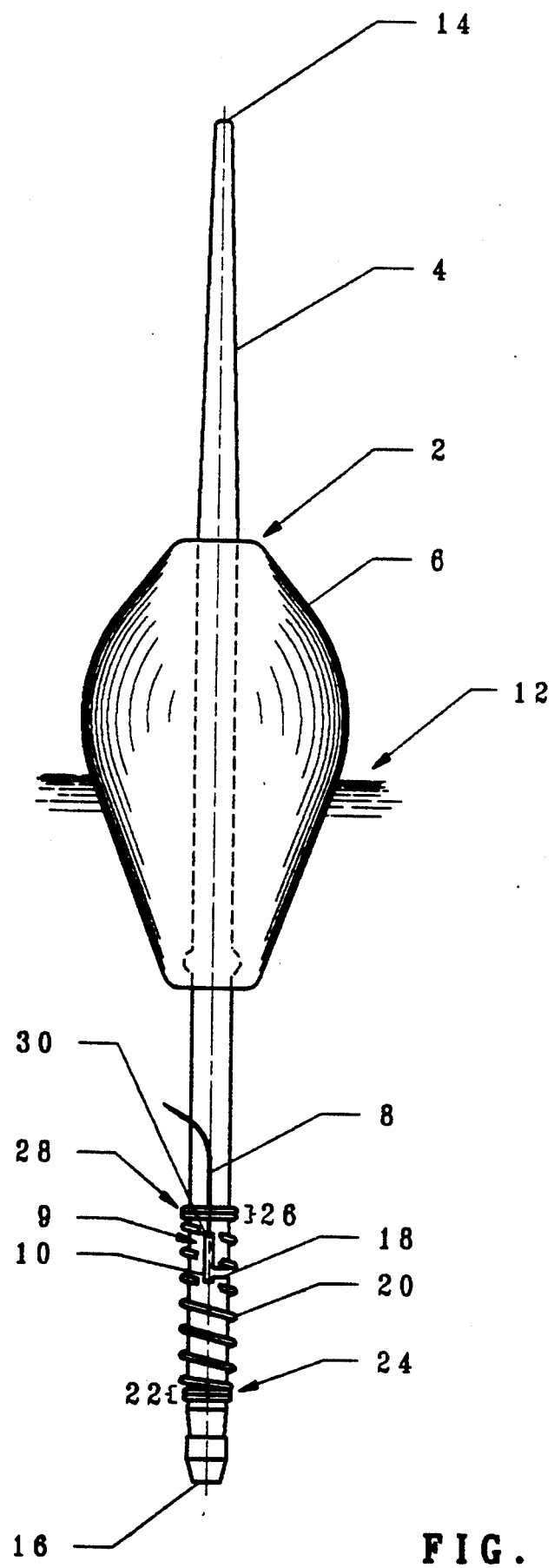
FIG. 1 is an elevational view of a fishing float in accordance with the present invention, depicting the fishing float as it would normally sit in water.

Referring now to the drawings, FIG. 1 shows a fishing float generally designated by the numeral 2 constructed in accordance with the present invention. Fishing float 2 includes stem 4 and buoyant member 6. Buoyant member 6 is made of a material which has a density less than that of water. Buoyant member 6 may be a separate piece carried by stem 4 as shown, or formed integrally with stem 4. Fishing line 8 passes through stem 4 via longitudinal portion 10 in stem 4.

In FIG. 1, float 2 is shown floating upright in water 12. In this position, stem 4 is oriented in a generally vertical position in water 12. Stem 4 has second end 14, at the top of stem 4, and first end 16, at the bottom of stem 4. As depicted in FIG. 1, slot 9 includes longitudinal portion 10, disposed generally aligned with the center axis of stem 4. Longitudinal portion 10 is in communication with lateral portion 18 of slot 9, and is generally perpendicular to longitudinal portion 10. In the configuration of FIG. 1, lateral portion 18 lies in a horizontal orientation. At least a portion of fishing line 8 is disposed in longitudinal portion 10 during normal operation of fishing float 2.

Surrounding a portion of the lower half of stem 4 is spring 20. Spring 20 includes a plurality of coiled windings which fit somewhat loosely around the outer diameter of the stem 4. Spring 20 also includes windings 22 at first spring end 24 and windings 26 at second spring end 28, as shown in FIG. 1. First windings 22 and second windings 26 have smaller diameters than the remainder of spring 20, fitting somewhat snugly about the outer diameter of stem 4.

FIG. 1 depicts spring 20 in the fixed line condition, where spring 20 is not compressed, and second windings 26 of spring 20 are located between buoyant member 6 and first end 30 of longitudinal portion 10. In this manner, second windings 26 bind fishing line 8 against stem 4 such that fishing line 8 cannot be easily pulled through longitudinal portion 10.

FIG. 2 illustrates one end of stem 4 without spring 20 in place. Longitudinal portion 10 extends generally parallel to and is aligned with the center axis of stem 4. Longitudinal portion 10 is in communication with lateral portion 18 which extends generally transverse to the center line of stem 4. Longitudinal portion 10 extends from lateral portion 18 in a direction towards buoyant member 6 (shown in FIG. 1). First end 30 of longitudinal portion 10 is located between lateral portion 18 and buoyant member 6.

FIG. 3 is similar to FIG. 2, but includes spring 20 disposed about stem 4 in a position so as to resist the movement of fishing line 8, which is disposed at least partially in longitudinal portion 10, toward lateral portion 18. As shown in FIG. 3, second spring end 28 of spring 20 is located at a position between lateral portion 18 and first end 30 of longitudinal portion 10. In this position, a slip line condition is created such that fishing line 8 may freely slide, or slip through longitudinal portion 10. Spring 20 presents a resilient resistance to the movement of fishing line 8 in a direction away from buoyant member 6 and toward first stem end 16.

When fishing line 8 is jerked, such as to set a hook in a fish's mouth, the initial direction which fishing line 8 tends to move is toward first end 30. In the configuration of the present invention, with longitudinal portion 10, including first end 30, located between lateral portion 18 and buoyant member 6, the direction of movement of fishing line 8 is in a direction away from lateral portion 18 toward first end 30.

Figure 4:
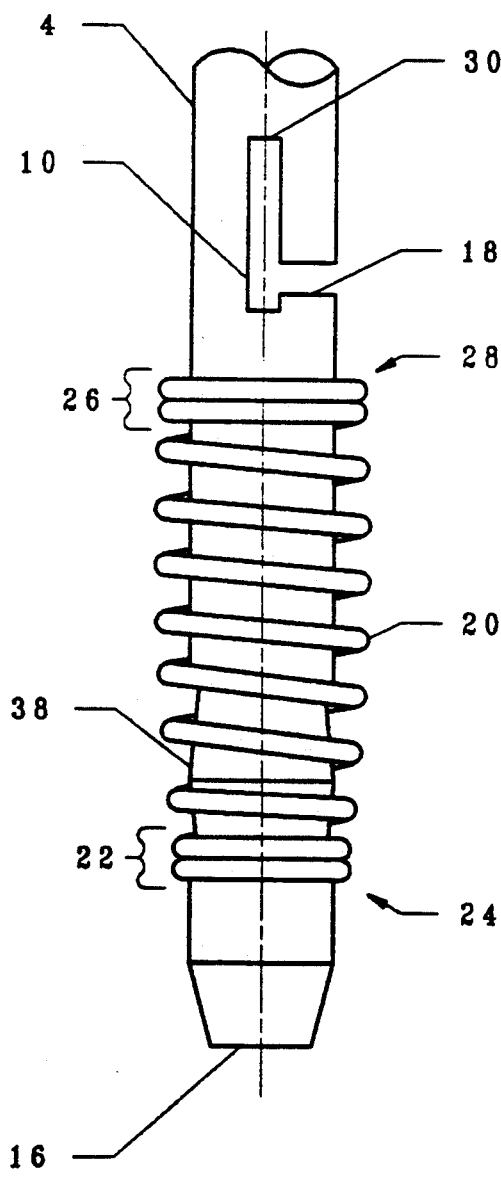
FIG. 4 is an elevational view of one end of the stem illustrating the spring in the line receiving position.

FIG. 4 illustrates spring 20 disposed about stem 4, with spring 20 being compressed (typically by hand) so as to create a line receiving condition. With second spring end 28 of spring 20 located between end 16 of stem 4 and lateral portion 18, lateral portion 18 is exposed so that fishing line 8 may be passed therethrough and into longitudinal portion 10. When the compressive force against spring 20 is released, second spring end 28 will return to the position shown in FIG. 3.

Second spring end 28 of spring 20 may also be located in a position so as to create a fixed line condition. Referring again to FIG. 2, there is also depicted lock groove 32. Lock groove 32 is formed in stem 4 at a location between lateral portion 18 and end 16 of stem 4. Lock groove 32 includes first frustoconical surface 34 which converges in a direction toward lateral portion 18 and longitudinal portion 10, and second frustoconical surface 36 which converges in the opposite direction from that of first frustoconical surface 34, toward end 16. First frustoconical surface 34 and second frustoconical surface 36 adjoin each other at their respective bases at high point 38, which has a diameter approximately equal to the outside diameter of stem 4. First shoulder 40 is located at the end of first frustoconical surface 34 distal from high point 38 as shown. Similarly, second shoulder 42 is located at the end of frustoconical surface 36 distal from high point 38. As shown in FIG. 3, the free length of spring 20 is such that when first spring end 24 is disposed adjacent shoulder 42, second spring end 28 is located intermediate lateral portion 18 and first end 30 of longitudinal portion 10, so as to create the slip line condition. First spring end 24 is retained between shoulder 42 and high point 38 due to the inside diameter of windings 22.

Figure 5:
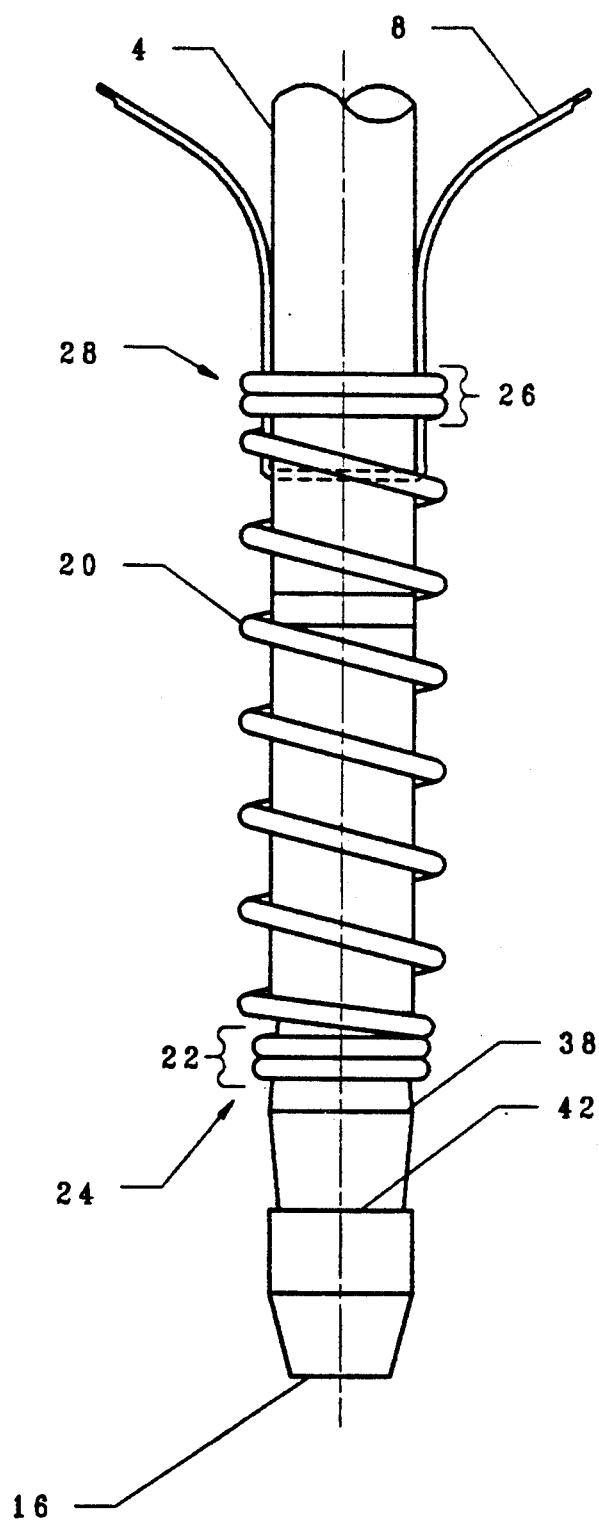
FIG. 5 is an elevational view of one end of the stem taken at a 90° angle to FIG. 1, with the spring in a fixed line condition.

FIG. 5 shows spring 20 with second spring end 28 positioned so as to create a fixed line condition. First spring end 24 is located intermediate shoulder 40 and high point 38, being retained therebetween due to the inside diameter of windings 22. Second spring end 28 of spring 20 is thusly positioned between first end 30 of longitudinal portion 10 and buoyant member 6. Fishing line 8 is held against stem 4 in the manner shown in FIG. 5, frictionally engaged by windings 26 so as to act as a break or drag on fishing line 8.

Figures 6, 7:
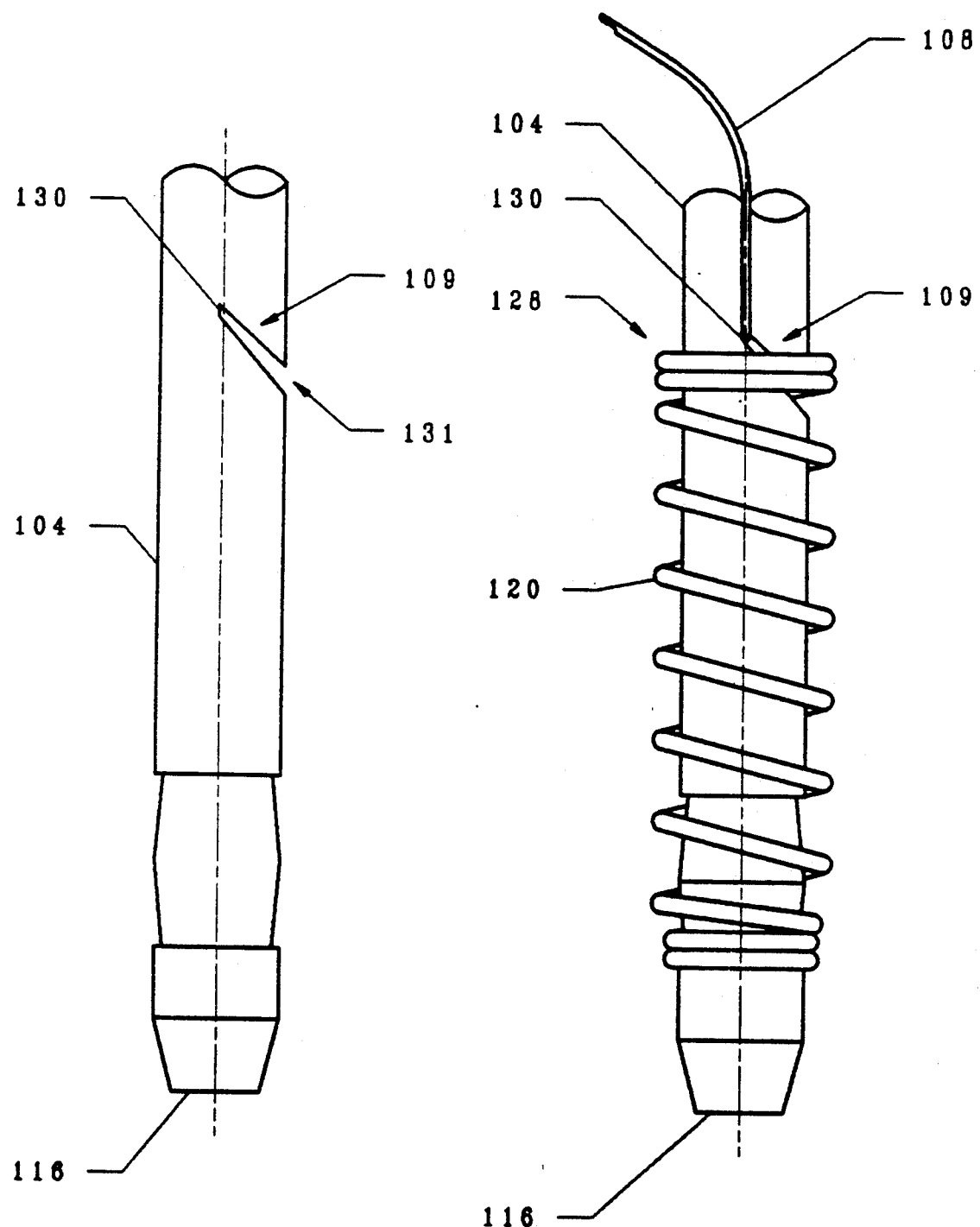
FIG. 6 is an elevational view of another embodiment of one end of the stems of the fishing float without the spring.
FIG. 7 is an elevation view of the embodiment of FIG. 6 illustrating the spring in the slip line condition.

FIG. 6 illustrates another and more general embodiment of the present invention. FIG. 6 illustrates first end 116 of stem 104 without a spring disposed thereabout. Slot 109 is formed in stem 104 at a location between the buoyant member (not shown) and first stem end 116. In this embodiment, at least a portion of slot 109, and as illustrated in FIG. 6 all of slot 109, is inclined inwardly in a direction away from first stem end 116 and toward the buoyant member. Slot 109 includes first end 130, and peripheral opening 131 (shown in side profile) which extends about a portion of stem 104.

FIG. 7 shows spring 120 disposed about stem 104 in a manner similar to that described above for spring 20, stem 4 and slot 9. In such a combination, spring 120 is secured to stem 104 in the manner described above with respect to spring 20. First end 128 of spring 120 may be located so as to create a slip line condition, a fixed line condition, and a line receiving condition. Spring 120 resists the movement of a fishing line 108 which is disposed at least partially in slot 109 in a direction away from the buoyant member (not shown) and toward first stem end 116. In this manner, spring 120 resiliently resists such movement of fishing line 108.

In summary, numerous benefits have been described which result from employing the concepts of the invention. The fishing float provides a highly reliable system for retaining a fishing line at the moment that a person fishing would jerk upon the fishing line. This is achieved by the use of a slot in the stem of the float and means for resisting the movement of the fishing line in a direction away from the buoyant member. The slot may have an inclined portion, a longitudinal portion and/or a lateral portion. The means may be a spring.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A fishing flat comprising:
   (a) a stem having first and second stem ends;
   (b) a buoyant member carried by said stem intermediate said first and second stem ends;
   (c) a slot formed in said stem between said buoyant member and said first stem end, said slot configured to have a portion of a fishing line disposed therein; and
   (d) a resilient biasing element which resists a movement of said portion of the fishing line disposed in said slot when said biasing element is not under compression, said resisted movement being in a direction away from said buoyant member and toward said first stem end, said biasing element having an end which is movable from a first position, when said biasing element is under compression, which lies between said first stem end and said slot, to a second position, when said biasing element is not under compression, which lies between said buoyant member and said slot.

2. A fishing float according to claim 1, wherein said slot is inclined inwardly in a direction away from said first stem end and toward said buoyant member.

3. A fishing float according to claim 2, wherein said resilient biasing element comprises a spring.

4. A fishing float according to claim 1, wherein said stem defines an axis and wherein said slot includes a lateral portion disposed transverse to said axis, and a longitudinal portion, said longitudinal portion extending from said lateral portion in a direction toward said buoyant member, said longitudinal portion having a first end located between said lateral portion and said buoyant member.

5. A fishing float according to claim 4 wherein said resilient biasing element comprises a spring having first and second spring ends, said first spring end being disposed between said lateral portion and said first end of said longitudinal portion.

6. A fishing float according to claim 5 wherein said first spring end is moveable to a location between said lateral portion and said first stem end so as to create a line receiving condition.

7. A fishing float according to claim 4 wherein said resilient biasing element comprises a spring having first and second spring ends, said first spring end being moveable between a first position located between said lateral portion and said first end of said longitudinal portion so as to create a slip line condition, and a second position located between said first end of said longitudinal portion and said buoyant member so as to create a fixed line condition.

8. A fishing float according to claim 7 wherein said first spring end is moveable to a third position located between said lateral portion and said first stem end so as to create a line receiving condition.

9. A fishing float according to claim 4, wherein said lateral portion is disposed perpendicular to said axis.

10. A fishing float according to claim 4, wherein said longitudinal portion is parallel to said axis.

11. A fishing float according to claim 10, wherein said longitudinal portion is aligned with said axis.

12. A fishing float according to claim 1 wherein said stem defines an axis and wherein said slot includes an inclined portion which is disposed transverse to said axis, said slot including a first end and a peripheral opening, said peripheral opening being disposed such that no portion of said peripheral opening lies between said first end of said slot and said buoyant member.

13. A fishing float according to claim 1, wherein said resilient biasing element is carried by said stem.

14. A fishing float according to claim 1, wherein when a fishing line is disposed in said slot, at least a portion of said resilient basing element is located between the fishing line and said first stem end.

15. A fishing float comprising:
(a) a stem having first end and second stem ends;
(b) a buoyant member carried by said stem intermediate said first and second stem ends;
(c) a slot formed in said stem between said buoyant member and said first stem end, said slot having a first slot end proximal to said buoyant member and a second slot end distal from said buoyant member; and
(d) a resilient biasing element carried by said stem, said resilient biasing element having a first element end and a second element end, said first element end being secured to said stem between said slot and said first stem end, said second element end being moveable from a first position when said resilient biasing element is under compression, said first position being within a first zone extending between said distal end of said slot and said first stem end, to a second position when said resilient biasing element is not under compression, said second position being within a second zone extending between said buoyant member and said first zone.

16. The fishing float as recited in claim 15, wherein said resilient biasing element comprises a spring.

* * * * *

UNITED STATES PATENT AND TRADEMARK OFFICE
CERTIFICATE OF CORRECTION

PATENT NO. : 5,329,722
DATED : July 19, 1994
INVENTOR(S) : Shane V. Wilson

It is certified that error appears in the above-indentified patent and that said Letters Patent is hereby corrected as shown below:

Column 5, line 67, change "flat" to --float--.
Column 7, line 5, change "basing' to --biasing--.

Signed and Sealed this

Fifteenth Day of November, 1994

Attest:

BRUCE LEHMAN

Attesting Officer

Commissioner of Patents and Trademarks